ANTIBIOTIC PROTICIN

László Vértesy, Kelkheim, Taunus, Paul Präve, Neuenhain, Taunus, and Dieter Sukatsch, Frankfurt am Main, Germany, assignors to Farbwerke Hoechst Aktiengesellschaft vormals Meister Lucius & Bruning, Frankfurt am Main, Germany
Filed July 16, 1971, Ser. No. 163,361
Claims priority, application Germany, July 18, 1970, P 20 35 812.7
Int. Cl. A61k 21/00
U.S. Cl. 424—122      3 Claims

ABSTRACT OF THE DISCLOSURE

An antibiotic, active against Gram-positive and Gram-negative bacteria and mycobacteria, the sodium salt of which antibiotic has the formula $C_{31}H_{44}O_7PNa$, has an ultra-violet spectrum showing maxima at 284, 275.5, 264, and 235 nanometers, and has an infrared spectrum showing peaks at 3400, 3080, 2920, 2820, 1725, 1640, 1445, 1370, 1160, 985, 890, and 750 cm.$^{-1}$. Process for preparing said antibiotic by cultivation of Bacillus licheniformis var. mesentericus.

---

Figure 1:
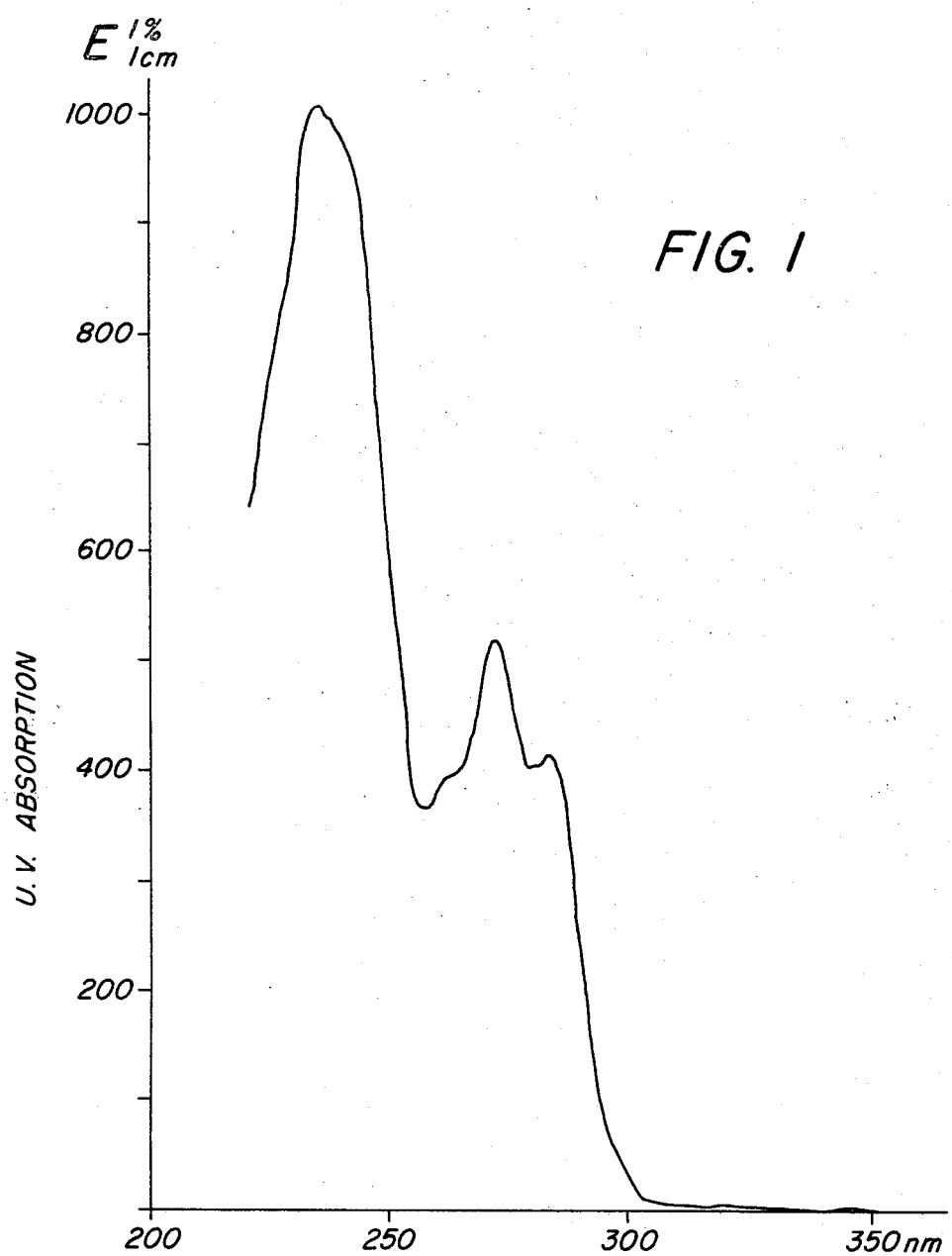

The present invention relates to a new antibiotic hereinafter termed "Proticin" and a process for its preparation, isolation and purification. The new antibiotic is obtained by microbiological cultivation of Bacillus licheniformis var. mesentericus FH–G–439 (lodged at American Type Culture Collection, Washington, D.C. under ATCC 21552), which has been isolated from a soil sample taken in Norway.

The bacillus or its variants and mutants may be cultivated according to usual microbiological processes, either under emerged conditions on agar slant tubes or under submerged conditions in Erlenmeyer flasks or fermenters, by using nutrient media or nutrient solutions generally used for cultivating microorganisms. These nutrient media or solutions contain, besides organic and inorganic salts, for example starch, cane sugar, molasses or glucose as sources of carbon and, for example, soy bean flour, cornsteep liquor, yeast extracts, peptones, nitrates or ammonium salts as sources of nitrogen. Apart from these complex nutrient solutions there may also be used synthetic nutrient solutions which contain, for example, glycerol, glycin, sodium chloride, potassium dihydrogenophosphate and magnesium sulfate.

Besides the mentioned cultivation processes there may also be employed continuous processes (cf. for example Methods in Microbiology, vol. 2, Academic Press, London-New York, 1970, pp. 259–328). In these systems the bacillus may be maintained for rather a long time in a steady state without spontaneous mutations or other degenerations becoming evident.

The antibiotic Proticin is isolated from the cell material of Bacillus licheniformis var. mesentericus by the processes described later herein.

The following description of the bacterium is based on morphological characteristics and physiological properties with regard to metabolism. Taxonomically the bacterium belongs to the family of Bacillacea, morphological group I of the genus Bacillus; it may be characterized as a variant of Bacillus licheniformis var. mesentericus.

The following Tables 1 and 2 indicate the morphological and physiological properties of the bacillus (ATCC 21552).

TABLE 1

| Nutrient | Consumption |
|---|---|
| Source of nitrogen, organic: | |
| Fructose | + |
| Arabinose | + |
| Mannose | ± |
| Raffinose | + |
| Mannitol | + |
| Starch | + |
| Glycerol | + |
| Maltose | + |
| Lactose | ± |
| Xylose | ± |
| Glucose | + |
| Sorbitol | + |
| Galactose | ± |
| Salicin | ± |
| Insulin | + |
| Saccharose | + |
| Rhamnose | ± |
| Dulcitol | ± |
| Source of nitrogen, inorganic: | |
| Glucose | + |
| Saccharose | + |
| Glycerol | + |
| Arabinose | + |
| Xylose | + |
| Mannitol | + |
| Lactose | ± |
| Rhamnose | + |
| Sorbitol | + |

TABLE 2

| Characteristic | |
|---|---|
| Size of spores | 0.5 x 1.0 |
| Size of rodlets | 2.0 x 6.0 |
| Gram colorization | + |
| Motility | ± |
| Slime formation | − |
| Gelatinase | + |
| Protease | + |
| Amylase | + |
| Lipase | + |
| Catalase | + |
| Urease | − |
| Cytochromoxdase | − |
| Phenylalaninedeaminase | − |
| Lysindecarboxylase | − |
| Lecithinase | + |
| Glucose-oxidase | − |
| Phosphatase | ± |
| Cellulase | − |
| Hemolysis | − |
| Growth in NaCl-solution 8% | + |
| Growth in NaCl-solution 9% | − |
| Growth at 40° C | + |
| Growth at 50° C | − |
| Indol-reaction | − |
| Voges-Proskauer-reaction | + |
| Methyl red-reaction | − |
| Development of $H_2S$ | + |
| $NO_3$-reduction | + |
| Citrate as source of carbon | ± |
| Pigment | − |
| Anaerobic growth | ± |
| Vitamin requirement | − |
| Growth in glucose | 4.9–7.2 |

KEY:
+ Nutrient is consumed or characteristic is present.
− Nutrient is not consumed or characteristic is not present.
± Nutrient or characteristic is consumed or present under special conditions.

The process for the preparation of the antibiotic Proticin or of one of its salts with a physiologically tolerable base is characterized by the fact that organisms forming this antibiotic and belonging to the strain of Bacillus licheniformis var. mesentericus (ATCC 21552) are cultivated at a temperature ranging between 20 and 40° C. by means of an aqueous nutrient solution which contains a source of carbon, a source of nitrogen, nutrient salts and trace elements until the nutrient solution contains considerable amounts of Proticin; the Proticin is extracted from the culture and converted, if desired, into a salt with a physiologically tolerable base. The nutrient salts particularly contain sodium, potassium, magnesium, calcium, phosphorus and sulfur. As trace elements iron and manganese are important. It is advantageous to carry out the cultivation in a large scale under submerged conditions in the nutrient solution. Temperatures between 28 and 30° C. are preferred. Cultivation is preferably effected under aerobic conditions. Under anaerobic conditions the yields are smaller.

During cultivation the pH value of the nutrient medium changes from neutral to slightly acidic; in general the addition of a buffer solution is not necessary. The cultivation is suitably stopped after 2 to 4 days, since a favorable yield is obtained after this period; the nutrient solution then contains a substantial amount of Proticin.

To isolate the antibiotic Proticin, the culture of the bacillus may be extracted as aqueous suspension with a polar organic solvent not miscible with water such as ethyl acetate, or with an alcohol which preferably contains 4 to 5 carbon atoms. The organic solvent containing the antibiotic is separated from the aqueous suspension, for example by centrifuging.

It is also possible first to filter or centrifuge the culture. As result a considerable part of the antibiotic remains in the cell mass which is expediently extracted with a water-miscible solvent, for example with acetone or a lower aliphatic alcohol. The antibiotic is extracted from the filtered or centrifuged aqueous liquid with one of the aforementioned polar solvents not miscible with water.

The antibiotic may also be precipitated from the separated aqueous solution by adding a solution containing suitable ions, for example polyvalent cations, preferably ions of cacium and barium, but also monovalent cations such as silver, with which Proticin forms difficultly soluble deposits in water. The precipitate is separated by filtering or centrifugation. The antibiotic is dissolved again by intercepting the cation used for precipitation, for example by binding the cation to complex forming agents such as ethylene diamin-tetra-acetate or by reprecipitating with anions such as sulfate, to which the corresponding cation has a stronger affinity that to the antibiotic. The antibiotic is isolated from the aqueous solution by extraction with a polar solvent as indicated above.

The organic extracts are concentrated. It is expedient to precipitate the antibiotic by adding an non-polar solvent; for this purpose hydrocarbons such as petroleum ether or cyclohexane are particularly suitable.

The crude product thus obtained may be purified by chromatography using an appropriate adsorbent such as polymeric silicic acids or aluminum oxide. The antibiotic is eluted with suitable polar solvents or mixtures of solvents, for example chloroform-methanol mixtures. If it is eluted with organic solvents, a partial inactivation of the adsorbent, for example by adding water or a phosphate buffer solution, may be advantageous for avoiding a loss of product.

If, however, mixtures of solvents are used which contain inorganic components, such as mixtures of water with ammonia with a lower amine, for example isopropanol-water-ammonia, the adsorbent retains the antibiotic, whereas the concomitants are eluted. The purified antibiotic is subsequently eluted with a mixture of solvents having the same or a smaller polarity, the alkaline portion, however, being absent or considerably smaller. For this purpose mixtures of isopropanol and water are suitable. By this way the Proticin salt of the base employed in each case is obtained.

The purification of the antibiotic may also be effected by molecular sieving processes such as gel chromatography, for example on Sephadex dextrans, with the aid of counter-current distribution, or by using ion exchangers. The mentioned processes for purifying Proticin may be repeated, if desired, or combined. When using the above-mentioned separation processes, the examination of the antibiotic activity is brought about for instance with an agar diffusion test, where the growth of *Escherichia coil* or *Proteus vulgaris* is inhibited.

The purity of the antibiotic may be tested by thin layer chromatography on silica gel with mixtures of polar solvents (compare Egon Stahl, "Dünnschicht-Chromatographie" (thin layer chromatography), Berlin, Heidelberg, New York, 1967, pp. 7–23). When using silica gel G plates, there are suitable for example the mixtures (a) chloroform-methanol-water having the volume ratio of 65:25:4 or (b) isopropanol-water-2 N-ammonia hydroxide having the volume ratio of 85:14:1.

The pure antibiotic Proticin is a colorless substance soluble in chloroform, tetrahydrofuran, acetone, ethyl acetate, lower alcohols, pyridine and water. It is difficulty soluble in unpolar solvents such as petroleum ether, cyclohexane or carbon tetrachloride. Upon acidifying an aqueous solution Proticin is precipitated.

With chlorosulfonic acid and glacial acetic acid, Liebermann-Burchard solution, antimony-tri-chloride, potassium permanganate, or ammonium molybdate and perchloric acid. Proticin shows color reactions whereas no coloration is obtained with iron-tri-chloride, dinitrosalicyclic acid, tetraphenyl-tetrazolium chloride, ninhydrine as well as with Morgan-Elson, Sakaguchi, Ehrlich, Dragendorff or Pauly reagents.

Proticin consists of carbon, hydrogen, oxygen and phosphorus. The molecular formula of the sodium salt was found to be $C_{31}H_{44}O_7PNa$, corresponding to 63.9% of C, 7.6% of H, 19.2% of O, 5.4% of P and 3.9% of Na. By way of analysis there were found 63.8% of C, 7.8% of H, 19.8% of O, 4.4% of P and 3.2% of Na. The lack of nitrogen, sulfur and halogen is noteworthy. Hitherto, antibiotics containing phosphorus and free of nitrogen have not been known, except for Phosphonomycine (D. Hendlin et al., Science, 166 (1969), 122–123). Proticin differs from Phosphonomycine i.a. by its ultraviolet spectrum. Proticin intensively adsorbs ultraviolet light; the adsorption curve is shown in FIG. 1 of this application. The maxima at 284, 272.5, 264 (not very distinct) and 235 nanometers are characteristic for Proticin.

Figure 2:
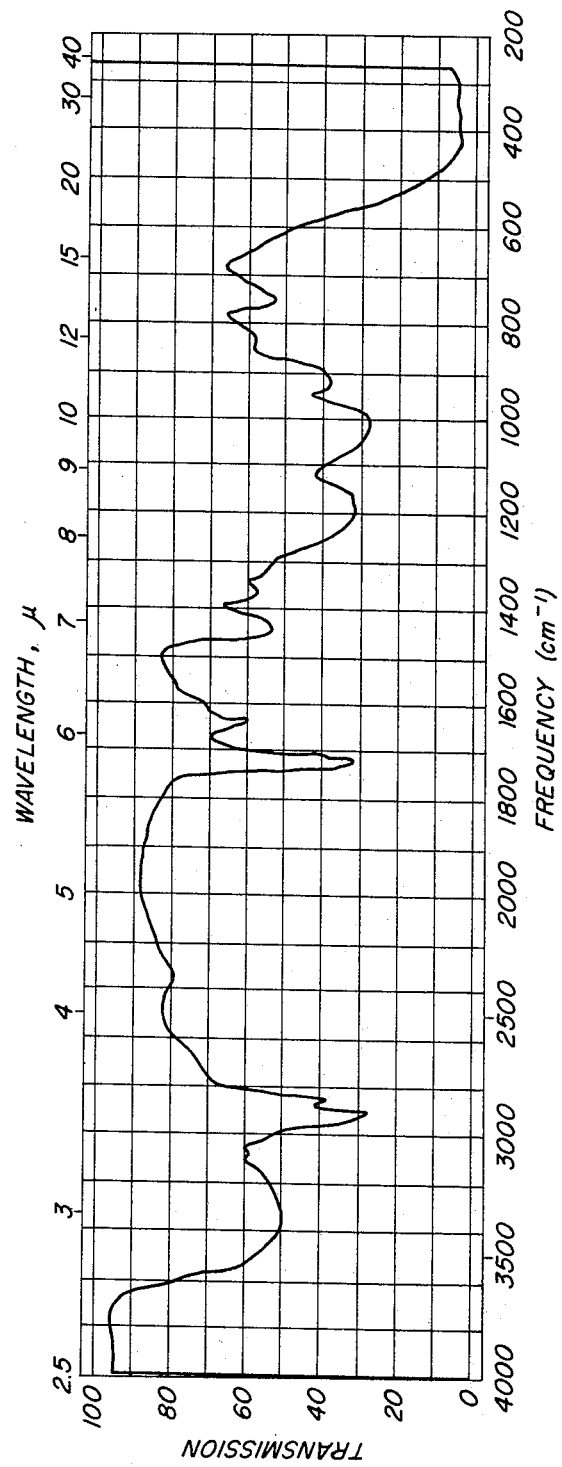

The IR spectrum given in FIG. 2 of this application shows peaks at 3400, 3080, 2920, 2820, 1725, 1640, 1445, 1370, 1160, 985, 890 and 750 cm.$^{-1}$.

The $R_f$-value of Proticin determined by thin layer chromatography on silica gel G with chloroform-methanol 3:2 amounts to 0.38.

The specific rotation $[\alpha]$ is $-78°$ (c.$=0.35$ in ethanol). In high voltage electrophoresis Proticin migrates as an acid.

The splitting off of phosphoric acid, which happens even at slightly acidic conditions, is characteristic of Proticin. The rest of the molecule is unstable and may undergo modifications even during formation. For characterizing the antibiotic, it is possible to resort to the organic cleavage products. All cleavage products exhibit some common physical properties: The UV spectra show adsorption maxima at 235, 264, 272.5 and 284 nanometers, whereas in the mass spectrum the following ion masses appear intensively: 41, 43, 55, 67, 81, 91, 93, 105, 107, 125, 231, 365, 444 and 462.

Proticin inhibits the growth of different Gram-positive and Gram-negative bacteria and mycobacteria. A selection of the minimum inhibiting concentrations found in the serial dilution test is listed in the following table.

| | Mcg./ml. |
|---|---|
| *Proteus mirabillis* | 0.4 |
| *Escherichia coli* | 12 |
| *Salmonella typhimurium* | 3 |
| *Shigella flexneri* | 3 |
| *Streptoccoccus haemolyticus* | 0.4 |
| *Straphyloccoccus aureaus* P209 | 50 |
| *Mycobacterium tuberculosis* H37RV5 | 5 |

Proticin has a small toxic effect. 100 mg./kg. of intravenous or 1000 mg./kg. of subcutaneous injection are tolerated by mice without any detectable damage.

(I) CULTIVATION OF THE BACILLUS

Example 1

*Bacillus licheniformis* var. *mesentericus* FH–G–439 (ATCC 21552) was inoculated on agar slant tubes having a nutrient medium of the following composition:

| | Percent |
|---|---|
| Starch | 8 |
| Ethanol | 0.5 |
| Na-citrate | 1 |
| Glucose | 0.5 |
| $MgSO_4$ | Trace |
| $CaCl_2$ | Trace |
| $FeSO_4$ | 0.01 |
| $(NH_4)_2HPO_4$ | 1 |
| Agar | 1.8 | pH 7 before and pH 6.8 after sterilization respectively.

The inoculated tube was maintained for 3 to 4 days at $+28°$ C. Then the cell material was floated off with 10 ml. of physiological NaCl solution. The suspension of the cell material of 5 tubes of this kind was introduced into a 1000 ml. Erlenmeyer flask charged with 250 ml. of the following nutrient solution:

| | Percent |
|---|---|
| Soluble starch | 0.75 |
| Soy bean groats | 0.5 |
| Cornsteep | 0.5 |
| Dry Slop | 0.05 |
| Trypticase | 0.005 |
| Casein peptone | 1.0 |
| Starch | 1.0 |
| NaCl | 0.25 |

This flask was shaken mechanically at 220 r.p.m. for one day at +28° C. Then 5 further Erlenmeyer flasks containing the same nutrient solution and charge were inoculated with 50 ml. taken from the culture in the first Erlenmeyer flask. The five flasks contained the main culture and were shaken at +28° C. at 200 r.p.m. on a shaking apparatus for 2-3 days.

Every day a sample as taken in a sterile state and the antibiotic activity of the culture solution was tested towards different microorganisms in the agar diffusion test. The filter disk test or the cap test were used. As test germs there were used E. coli and Proteus vulgaris. Inhibiting zones of 25 mm. towards E. coli and 37 mm. towards Proteus showed high antibiotic activities, corresponding to a concentration of 98 mg. of pure substance per liter. If these highest activities were measured in the test, the cultivation was discontinued (generally after 50 to 60 hours) and the culture was worked up as described below.

Example 2

Bacillus licheniformis var. mesentericus (ATCC 21552) was inoculated on agar slant pipes which were charged with the following nutrient medium:

| | Percent |
|---|---|
| Yeast extract | 0.1 |
| Malt extract | 0.1 |
| Loess clay | 1.0 |
| Meat-extract | 0.1 |
| Casein peptone | 2.5 |
| Trypticase | 0.01 |
| Glucose | 0.5 |
| Agar | 1.8 |
| Soy bean oil | 0.01 |
| Cornsteep | 0.05 |
| $CaCo_3$ | 1.0 |
| Cane sugar | 1.0 |
| Soy bean flour | 1.0 |
| Starch | 1.0 |

Ad 1000 ml. of water, pH 6.8.

These pipes were maintained for 3 days at +28° C. Then they were kept for five days at room temperature, so that the majority of the bacteria had developed permanent forms (spores). The spore material was floated off with 10 ml. of a physiological NaCl solution in a 1000 ml. flask. The spore suspension was inoculated with 250 ml. of the above nutrient solution without agar. For two flasks there were needed 5 pipes, that means per each flask 50 ml. of the spore suspension. The pre-cultures thus obtained were shaken mechanically for 2 days with 220 r.p.m. at +28° C. Then a 30 l. fermentation vessel provided with a stirrer, an air feeding pipe and joining pieces for taking samples and adding anti-foaming agent was filled with 10 l. of a nutrient solution having the following composition:

| | Percent |
|---|---|
| Starch | 4 |
| Cornsteep | 0.4 |
| Glucose | 1.0 |
| $(NH_4)_2HPO_4$ | 0.8 |
| Soy bean flour | 0.4 |
| Casein peptone, pH 7.2–7.4 | 1.0 |

Aqua dest. ad 10 l.

The whole was sterilized for 45 minutes at 121° C. and 1 atmosphere gauge. 0.1% of polypropylene glycol were added to the contents of the fermenter as anti-foaming agent. As cell material there were used 500 ml. of the aforementioned pre-culture. Fermentation was effected at +28° C. for 48 hours, while introducing 500 l. air/hour. By taking samples in a sterile state, the development of the fermentation was controlled and the antibiotic activity determined as given in Example 1. When the fermentation was discontinued, the concentration of the antibiotic amounted to 111 mg./l.; the pH value ranged between 6.7 and 7.0.

Example 3

Bacillus licheniformis var. mesentericus (ATCC 21552) was cultivated on an agar slant pipe having the same contents as given in Example 2. The obtained spore suspension was introduced in a sterile state into five 1000 ml. Erlenmeyer flasks each containing 250 ml. of the nutrient solution used in Example 2 as main culture. After keeping for 2 days at 28° C. and 220 r.p.m. on the shaking apparatus, the cell material was introduced into a fermenter of a 100 l. total volume and a 50 l. working volume containing a nutrient solution as indicated in Example 2 for the main culture.

The fermenter was sterilized for 40 minutes at 121° C. and 1 atmosphere gauge while stirring, inoculated with 500 ml. of the cell material and stirred for 60 hours at +30° C. with 150 r.p.m. 3000 l. of air were introduced per hour. As anti-foaming agent 0.1% of polypropylene glycol was added. The development of fermentation was controlled by taking samples to be tested as given in Example 1. When the fermentation was discontinued, the pH value amounted to 6.6; the yield was 104 mg. of Proticin per liter of culture liquid.

(II) ISOLATION OF PROTICIN

Example 4

The combined fermentation solutions (1 liter) obtained according to Example 1 were centrifuged. The aqueous supernatent portion which contains the greatest portion of the antibiotic, was separated. The remaining residue of bacteria cells and undiluted medium was washed with a threefold amount of methanol and stirred for 1 hour in order to obtain further amounts of the product. Then the whole was centrifuged again. The undissolved components were eliminated. The clear methanolic supernatent portion was to a large extent freed from methanol under reduced pressure, and the concentrate was added to the centrifuged culture solution. The combined solutions were extracted twice with 500 ml. of butanol each. The aqueous phase was eliminated, the butanol extracts were combined and concentrated under reduced pressure about 10 ml. Upon addition of petroleum ether (boiling range between 40 and 60° C.), 1.6 g. of a grey brown powdery precipitate was obtained, having an activity of 56 micrograms of pure substance per milligram of the product.

The product was purified by column chromatography on silica gel impregnated with phosphate buffer. The adsorbent was prepared by addition of 1 liter of a 0.4 N phosphate buffer solution of pH 6.7 ($NaH_2PO_4$ and $Na_3PO_4$) to 1 kg. of silica gel having a grain size between 0.05 and 0.2 mm. The mixture was stirred and dried for 2 days at 110° C. Then 50 ml. of water were added and the whole was shaken for 2 hours. 50 g. of this adsorbent were suspended with chloroform in a glass-column having an inside dameter of 2.5 cm. The aforementioned precipitation product was dissolved in 5 to 10 ml. of chloroform, if necessary by addition of a little amount of methanol, and added to the column. Then the impurities were washed from the column with 200 ml. each of a chloroform-methanol mixture at the volume ratio of 9:1, 8:2 and 7:3. Subsequently the antibiotic was eluted with chloroform-methanol (6:4 volumina). The fractions being active towards *Proteus vulgaris* were collected. They contained 341 mg. of solid substance having an activity of 220 mg. of Proticin per mg. of dry substance.

Further purification of the antibiotic was carried out by means of gel chromatography. For this purpose 36 g. of Sephadex LH 20 in a mixture of chloroform-methanol were swelled up at the volume ratio of 1:1 and filled into a glass column having a length of 30 cm. and an inside diameter of 2.5 cm. 320 mg. of the above antibiotic were dissolved in chloroform-methanol, applied onto the column. As eluent there was used chloroform-methanol (1:1 volume). The antibiotic efficiency of fractions each containing 10 ml. of eluate was examined. After concentrating the fractions showing antibiotic reaction, 98 mg. of crude antibiotic were obtained having a specific activity of 694 mcg./mg.

Gel chromatography was repeated on a column having a length of 2 meters and a content of 1 liter. After introducing 95 mg. of the crude antibiotic, fractions of 10 ml. each were collected. The main portion of the Proticin was found in the 193rd to 206th fraction. 28 mg. of pure Proticin having a rotation value [α], of minus 78° C. were obtained from the pipes 198 to 206.

Example 5

The fermentation solution (9.1 l. with a content of 106 mg. of pure substance/l.) obtained according to Example 2 was mixed with 3 l. of butanol and 3 l. of ethyl acetate and stirred for 30 minutes. Then the whole was centrifuged. The organic phase was separated and concentrated under reduced pressure to 20 ml. The aqueous layer and the slop were discarded. The crude antibiotic was precipitated from the concentrate of the organic phase with 0.2 l. of petroleum ether. 12 g. of a powder of 66 mcg. of pure substance/mg. were obtained. Then 500 g. of silica gel (grain size of from 0.05 to 0.2 mm.) were suspended in a mixture of isopropanol-water-2 N-ammonia (90:6:4 volume) and filled into a glass column (inside diameter 6 cm., length 50 cm.). The precipitated powder was dissolved in 50 ml. of the same solvent mixture and added to the column. The column was washed with about 6 l. of isopropanol-water-2 N-ammonia (90:6.4 volume) until the eluate was nearly without color; the so-obtained washing solution was discarded. The antibiotic was subsequently eluted with isopropanol-water (9:1 volume); the eluate was collected in fractions of 100 ml. each and examined with regard to its antibiotic activity. The fractions containing more than 0.1 mg. of antibiotic in 1 ml. were combined and freed from the solvent under reduced pressure. The amorphic light yellow residue contained the ammonium salt of Proticin. The yield was 1.1 g., the specific activity being 443 mcg./mg. After further purification by means of Sephadex LH 20 according to Example 4, the pure antibiotic was obtained as the ammonium salt.

Example 6

44.1 of the fermentation solution obtained according to Example 3 were extracted, concentrated and precipitated according to Example 4 or 5. The so-obtained powder (58 g., corresponding to 63 mcg. of pure substance/mg.) was dashed with 1.5 l. of water and neutralized with 2 N NaOH. A clear dark brown solution resulted, to which 100 ml. of a 2 N barium chloride solution was added while stirring. After 15 minutes the whole was centrifuged. The antibiotic was found as barium salt in the precipitate. The dark supernatent portion was eliminated. The precipitation product was washed with water containing a minor amount of barium chloride and centrifuged again. Then the deposit was stirred in 400 ml. of a 5% sodium sulfate solution. By this way the voluminous precipitation product was slowly dissolved, whereas fine-grained barium sulfate was precipitated. After 1 hour the whole was extracted twice with 250 ml. of N-butanol. The organic solvents were combined, washed with a little amount of water and concentrated at 30–40° C. under reduced pressure. There were left 11 g. of a dark, viscous foamlike product having an activity of 277 mcg. of Proticin/ml. From this product the pure Proticin was prepared according to the process indicated in Example 4 or 5.

What is claimed is:

1. An antibiotic, Proticin, soluble in chloroform, tetrahydrofuran, acetone, ethyl acetate, lower alcohols, pyridine, and water; giving a color reaction with chlorosulfonic acid/glacial acetic acid, Liebermann-Burchard solution, antimony trichloride, potassium permanganate, and ammonium molybdate/perchloric acid; and forming a sodium salt of the empirical formula $C_{31}H_{44}O_7PNa$ as determined by the following analysis: calculated (percent): C, 63.9; H, 7.6; O, 19.2; P, 5.4; Na, 3.9.; found (percent): C, 63.8; H, 7.8; O, 19.8; P, 4.4; Na, 3.2; said sodium salt having an ultra-violet spectrum with maxima at 284, 275.5, 264, and 235 nanometers and an infra-red spectrum with peaks at 3400, 3080, 2920, 2820, 1725, 1640, 1445, 1370, 1160, 985, 890, and 750 cm.$^{-1}$.

2. An acid addition salt of the antibiotic of claim 1 with a physiologically tolerable base.

3. A composition active against Gram-positive and Gram-negative bacteria and mycobacteria comprising an anti-bacterially effective amount of the antibiotic of claim 1 or of a salt thereof with a physiologically tolerable base, in admixture with a pharmaceutically acceptable carrier.

References Cited

R. Miller: The Pfizer Handbook of Microbial Metabolites, McGraw-Hill Book Co., Inc., New York, N.Y., 1961, pp. 396 and 397.

JEROME D. GOLDBERG, Primary Examiner

U.S. Cl. X.R.

195—80